US012741599B2

(12) United States Patent
Grunert

(10) Patent No.: US 12,741,599 B2
(45) Date of Patent: Sep. 22, 2026

(54) LOAD FLOOR ASSEMBLY FOR A MOTOR VEHICLE AND TRUNK WITH SUCH A LOAD FLOOR ASSEMBLY

(71) Applicant: Dr. Ing. h.c. F. Porsche Aktiengesellschaft, Stuttgart (DE)

(72) Inventor: Daniel Grunert, Wimsheim (DE)

(73) Assignee: Dr. Ing. h.c. F. Porsche Aktiengesellschaft, Stuttgart (DE)

( * ) Notice: Subject to any disclaimer, the term of this patent is extended or adjusted under 35 U.S.C. 154(b) by 483 days.

(21) Appl. No.: 18/281,076

(22) PCT Filed: Feb. 22, 2022

(86) PCT No.: PCT/EP2022/025059
§ 371 (c)(1),
(2) Date: Mar. 1, 2024

(87) PCT Pub. No.: WO2022/214212
PCT Pub. Date: Oct. 13, 2022

(65) Prior Publication Data

US 2025/0326359 A1 Oct. 23, 2025

(30) Foreign Application Priority Data

Apr. 6, 2021 (DE) ..................... 10 2021 108 504.7

(51) Int. Cl.
*B60R 13/01* (2006.01)
*B60R 5/04* (2006.01)

(52) U.S. Cl.
CPC ............. *B60R 13/013* (2013.01); *B60R 5/04* (2013.01)

(58) Field of Classification Search
CPC ........... B60R 5/00; B60R 5/003; B60R 5/006; B60R 5/04
See application file for complete search history.

(56) References Cited

U.S. PATENT DOCUMENTS 9,623,804 B2 4/2017 Warnecke
2002/0070574 A1* 6/2002 Carlsson .................. B60R 7/02 296/37.14

(Continued)

FOREIGN PATENT DOCUMENTS

DE 102018208345 A1 11/2019
JP 2008247167 10/2008

(Continued)

*Primary Examiner* — Yanick A Akaragwe
(74) *Attorney, Agent, or Firm* — Buchanan Ingersoll & Rooney PC

(57) ABSTRACT

A load floor assembly for a motor vehicle (2) has a rigid floor element (10) with a covering (20) for covering a trunk recess (18) and bearing surfaces (32, 34, 36, 38, 40, 42). The bearing surfaces are connected to contact surfaces that enclose the trunk recess (18). The floor element (10) includes a first floor section (14) connected to a second floor section (16) by a hinge (12) for pivoting about a transverse axis of the vehicle. End faces (48, 50) of the floor sections (14, 16) that face one another have engagement surfaces (52, 54) with reduced heights so that the floor sections (14,16) engage in one another while the cross-sectional height of the floor element (10) remains unchanged. The first engagement surface (52) is above the second engagement surface (54) and has a rounded end portion (56) that faces the second engagement surface (54).

5 Claims, 2 Drawing Sheets

(56) References Cited

U.S. PATENT DOCUMENTS

| | | | | |
|---|---|---|---|---|
| 2010/0187857 | A1* | 7/2010 | Fischer | B60R 5/04 296/184.1 |
| 2013/0278019 | A1* | 10/2013 | Preisler | B60R 5/04 296/193.07 |
| 2016/0229347 | A1* | 8/2016 | Warnecke | B60R 5/04 |

FOREIGN PATENT DOCUMENTS

| | | |
|---|---|---|
| JP | 2011056983 | 3/2011 |
| KR | 101997368 | 7/2019 |

* cited by examiner

A-A
B-B

LOAD FLOOR ASSEMBLY FOR A MOTOR VEHICLE AND TRUNK WITH SUCH A LOAD FLOOR ASSEMBLY

CROSS-REFERENCE TO RELATED APPLICATIONS

This application is the is national phase of PCT/EP2022/025059, filed on Feb. 22, 2022, which claims priority on German Patent Application DE 10 2021 108 504.7, filed on Apr. 6, 2021, the entire disclosures of which are incorporated herein by reference.

BACKGROUND

Field of the invention. The invention relates to a load floor assembly for a motor vehicle with a rigid floor element that comprises a covering surface for covering a trunk recess and bearing surfaces. The bearing surfaces are connected operatively to contact surfaces that at least partly enclose the trunk recess. The floor element comprises at least a first floor section connected to a second floor section by hinge means such that it can pivot about a transverse axis of the motor vehicle. End faces of the floor sections that face one another comprise engagement surfaces that have a reduced cross-sectional height, such that the floor sections engage in one another while the cross-sectional height of the floor element remains unchanged. At least the first engagement surface, as viewed in the vertical axis of the motor vehicle, is arranged above the second engagement surface and comprises, in the end region, a rounded portion that faces the second engagement surface. The invention also relates to a trunk with such a load floor assembly.

Load floor assemblies, as described above, are well-known in the prior art. They serve to cover a trunk recess under the actual loading surface. Small items, such as cables, tools or even personal objects, can be kept in this trunk recess without having to be placed in the actual trunk. The floor element of the load floor assembly has to be sufficiently rigid to withstand the weight of a load in the actual trunk without problems. Furthermore, the floor element must be designed in such a way that the trunk recess is easily accessible to the user of the motor vehicle. A load floor assembly that meets these different requirements is known from U.S. Pat. No. 9,623,804. To ensure easy opening of the trunk recess along with a high load bearing capacity for the floor element, the end faces of the floor sections facing one another comprise a number of teeth that engage in one another. An upper tooth has a rounded portion for easy adjustment. Such a load floor assembly is relatively complex to manufacture and assemble and is therefore expensive.

An object of the invention is to avoid the aforementioned disadvantage in a simple manner.

SUMMARY OF THE INVENTION

One embodiment of the invention relates to a load floor assembly configured so that the engagement surfaces or engagement sections of the load floor assembly are continuous along a width direction of the vehicle. This can significantly reduce the complexity of manufacturing and assembly. Easy opening along with high load bearing capacity of the floor element is given with this design as well. Instead of two, more floor sections can also be provided and can be pivoted relative to one another.

In a further embodiment, the hinge means are configured as a part of a textile upper layer arranged on the floor element. This provides the loading space assembly with a very high-quality appearance and enables the hinge means to be implemented in a particularly simple manner.

In some embodiments, the engagement surfaces are provided exclusively in the region of the covering surface of the floor element. In this way, the pivoting of the floor sections relative to one another is further facilitated. The bearing surfaces may cooperate with the contact surfaces that enclose the trunk recess to ensure sufficient stability of the floor element.

In a further embodiment, the floor sections respectively comprise an underlayer that is rigid at least in the region in which the engagement surfaces lie on top of one another. Additionally, the second engagement surface rests on the underlayer of the first engagement surface. The rigidity of the floor element in the region of the hinge means can thus be increased even more. The fact that the second engagement surface comprises a rounded portion on the side facing away from the first engagement surface also makes it possible to easily pivot the second floor section relative to the first floor section, for example from the vehicle interior.

The object also is achieved by a trunk with such a load floor assembly. Contact surfaces are provided. The contact surfaces enclose a trunk recess and cooperate with corresponding bearing surfaces of the floor element.

The invention is explained in more detail with reference to the drawings.

DETAILED DESCRIPTION

Figure 1:
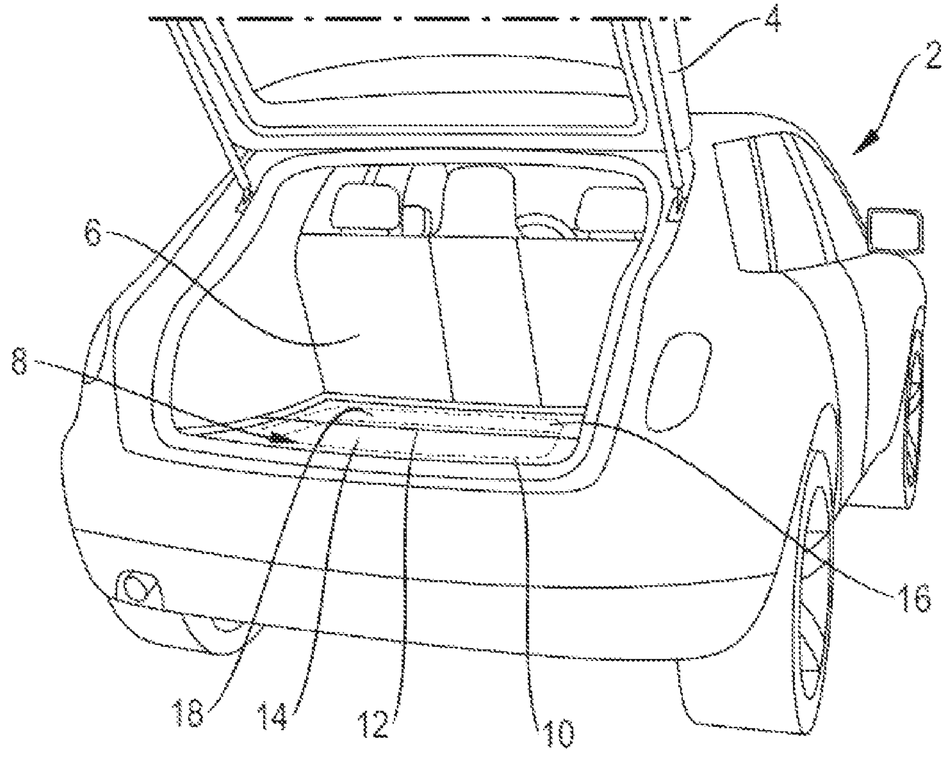
FIG. 1 is a perspective rear view of a motor vehicle with the trunk open.

FIG. 1 shows a perspective rear view of a motor vehicle 2 with an open trunk lid 4 so that the view of a trunk 6 of the motor vehicle 2 is unobstructed. The figure shows a load floor assembly 8, of which a rigid floor element 10 comprising two floor sections 14, 16 connected by hinge means 12, provided in the trunk 6. The floor element 10 is shown transparent here, so that a trunk recess 18 covered by a covering surface 20 is implied (see FIG. 2).

Figures 2, 3, 4:
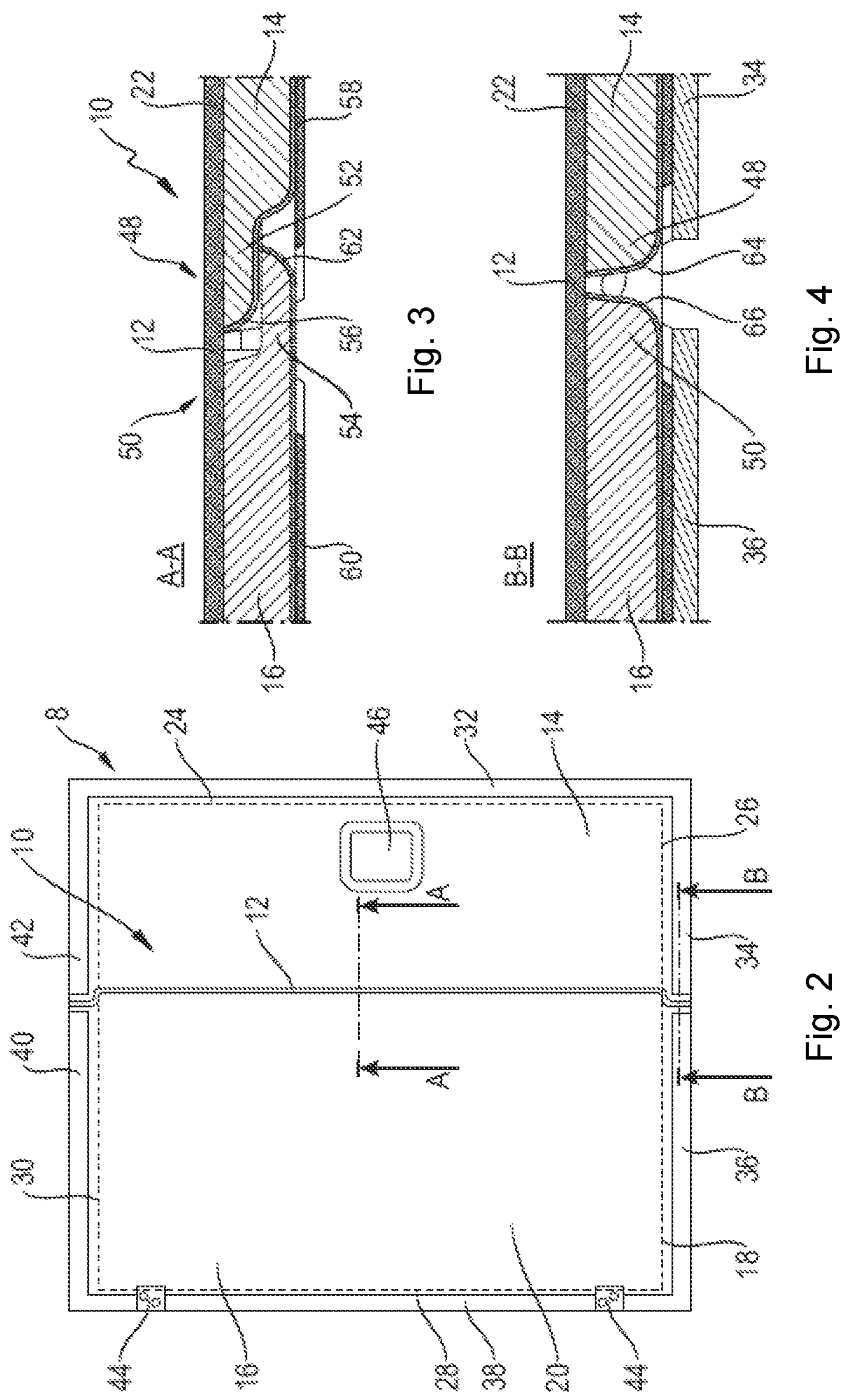
FIG. 2 is a plan view onto a load floor assembly according to the invention.
FIG. 3 is a sectional view in accordance with section A-A in FIG. 2
FIG. 4 is a sectional view in accordance with section B-B of FIG. 2.

FIG. 2 shows a plan view onto the load floor assembly 8 according to the invention. For the sake of clarity, a textile upper layer 22 has been omitted in this view, but the textile upper layer 22 is shown in both FIG. 3 and FIG. 4. The textile upper layer 22 functions as hinge means 12, as will also be explained in more detail in connection with FIGS. 3 and 4. As already indicated in connection with FIG. 1, the floor element 10 comprises a covering surface 20 for covering an underlying trunk recess 18. The recess 18 is indicated by a dashed line. The recess 18 is delimited here by contact surfaces 24, 26, 28, 30. By their very nature, the contact surfaces 24, 26, 28, 30 are located on the side of the dashed line facing away from the trunk recess 18. In addition to the covering surface 20, the rigid floor element 10 comprises bearing surfaces 32, 34, 36, 38, 40, 42 that rest on the contact surfaces 24, 26, 28, 30. The floor element 10 also is connected to the contact surface 28 via releasable clip elements 44.

To now allow easy access to the trunk recess 18, the floor element 10 comprises two floor sections 14, 16 that are connected pivotably to one another via the hinge means 12. The floor section 14 can easily be lifted by reaching into a recessed grip 46. The floor section 16, too, can be lifted from the vehicle interior by releasing the clip elements 44.

The structure of the floor element 10, and in particular the structure of the two floor sections 14, 16, will now be explained in more detail with reference to FIGS. 3 and 4. FIG. 3 shows a sectional view of the floor element 10 in the region of section A-A. The textile upper layer 22, which forms the hinge means 12 in the region of the end faces 48, 50 facing one another, can clearly be seen first. The end faces 48, 50 in each case comprise continuous first and second engagement surfaces or engagement sections 52, 54 that extend continuously across the width in the transverse axis direction of the motor vehicle. The engagement surfaces 52, 54 have a reduced cross-sectional height relative to the floor sections 14, 16, such that the floor sections 14, 16 can engage in one another while the cross-sectional height of the floor element 10 remains unchanged. Viewed in the vertical axis of the motor vehicle, the first engagement surface 52 is arranged above the second engagement surface 54. The rigidity of the entire floor element 10 is ensured by such a configuration, despite the provided hinge means 12 in the region of the covering surface 20. To ensure easy pivoting of the first floor section 14 relative to the second floor section 16, the first engagement surface 52 comprises, in the end region, a rounded portion 56 that faces the second engagement surface 54. The floor sections 14, 16 in each case furthermore comprise an underlayer 58, 60 that is rigid at least in the respective end region. In the case of floor section 14, the underlayer 58 extends in the region of the engagement surfaces 52, 54 that lie on top of one another. For the rigidity of the floor element 10, it is advantageous if the second engagement surface 54 rests on the underlayer 58 of the first engagement surface 52. To enable easy pivoting of the second floor section 16, the second engagement surface 54 also comprises a rounded portion 62 on the side facing away from the first engagement surface 52.

FIG. 4 now shows a sectional view of section B-B in FIG. 2. Here, the end faces 48, 50 of the floor sections 14, 16 have no engagement surfaces. This is because the rigidity of the floor element 10 is ensured by resting on the respective bearing surfaces 34, 36, 40, 42. Only rounded portions 64, 66 that enable easy pivoting are provided.

The invention claimed is:

1. A load floor assembly for a motor vehicle (2) with a rigid floor element (10) that comprises a covering surface (20) for covering a trunk recess (18) and bearing surfaces (32, 34, 36, 38, 40, 42) that are operatively connected to contact surfaces (24, 26, 28, 30) that at least partly enclose the trunk recess (18), the floor element (10) comprises a first floor section (14) connected to a second floor section (16) by a hinge means (12) such that the first floor section (14) can pivot about an axis extending in a transverse direction of the motor vehicle, wherein end faces (48, 50) of the floor sections (14, 16) that face one another comprise engagement surfaces (52, 54) that have a reduced cross-sectional height, such that the floor sections (14, 16) engage in one another while a cross-sectional height of the floor element (10) remains unchanged, the first engagement surface (52) being arranged above the second engagement surface (54) and having a rounded portion (56) that faces the second engagement surface (54), wherein the engagement surfaces (52, 54) are configured such that the engagement surfaces extend in the transverse direction of the motor vehicle, wherein each of the floor sections (14, 16) respectively comprise an underlayer (58, 60), each of the underlayers is rigid at least in a region in which the engagement surfaces (52, 54) lie on top of one another, wherein the second engagement surface (54) rests on the underlayer (58) of the first engagement surface (52).

2. The load floor assembly of claim 1, wherein the hinge means (12) are defined by a textile upper layer (22) arranged on the floor element (10).

3. The load floor assembly of claim 2, wherein the engagement surfaces (52, 54) are provided exclusively in the region of the covering surface (20) of the floor element (10).

4. The load floor assembly of claim 1, wherein the second engagement surface (54) comprises a rounded portion (62) on a side facing away from the first engagement surface (52).

5. A trunk with the load floor assembly of claim 1, the trunk having a trunk recess (18) and contact surfaces (24, 26, 28, 30) that enclose a trunk recess (18) and cooperate with corresponding bearing surfaces (32, 34, 36, 38, 40, 42) of the floor element (10).

* * * * *